(No Model.)

5 Sheets—Sheet 1.

H. WYMAN.
LOOM.

No. 402,122. Patented Apr. 23, 1889.

Witnesses.
Arthur Zipperlen
John F. C. ...

Inventor:
Horace Wyman
by Crosby & Gregory attys (No Model.) 5 Sheets—Sheet 2.

H. WYMAN.
LOOM.

No. 402,122. Patented Apr. 23, 1889.

Witnesses.
Arthur Zippertm.
John F. C. Prinkert.

Inventor
Horace Wyman
by Crosby & Gregory attys (No Model.)

H. WYMAN
LOOM.

No. 402,122.    Patented Apr. 23, 1889.

Witnesses.
Arthur Zipperlen.
John F. C. Prentkert

Inventor:
Horace Wyman
by Crosby & Gregory attys (No Model.) 5 Sheets—Sheet 4.

H. WYMAN.
LOOM.

No. 402,122. Patented Apr. 23, 1889.

Witnesses. Inventor:
Arthur Zipperlen. Horace Wyman.
John F. C. Brinkert. by Crosby & Gregory attys.

(No Model.)  5 Sheets—Sheet 5.
H. WYMAN.
LOOM.
No. 402,122. Patented Apr. 23, 1889.
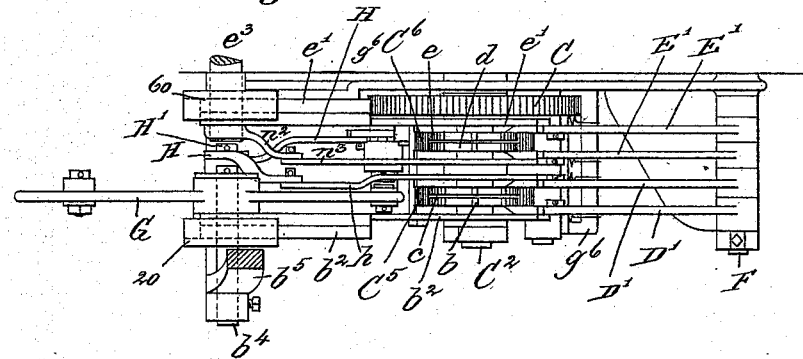
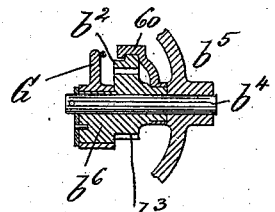
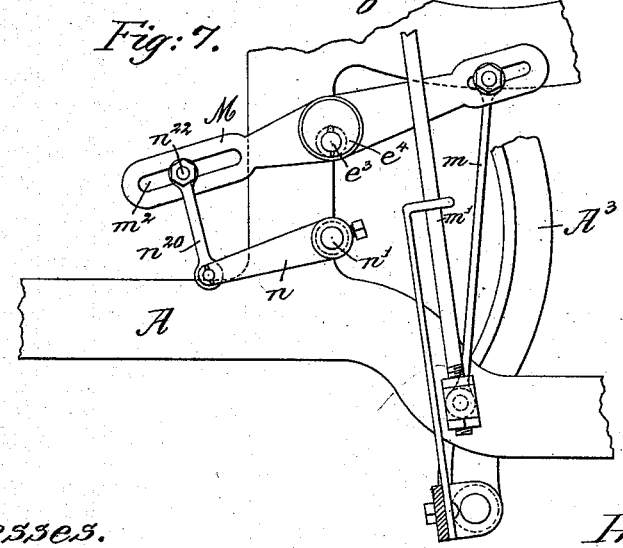
Witnesses.
Inventor:
Horace Wyman
by Crosby & Gregory attys.

UNITED STATES PATENT OFFICE.

HORACE WYMAN, OF WORCESTER, MASSACHUSETTS, ASSIGNOR TO THE CROMPTON LOOM WORKS, OF SAME PLACE.

LOOM.

SPECIFICATION forming part of Letters Patent No. 402,122, dated April 23, 1889.

Application filed March 18, 1886. Serial No. 195,673. (No model.)

*To all whom it may concern:*

Be it known that I, HORACE WYMAN, of Worcester, county of Worcester, and State of Massachusetts, have invented an Improvement in Looms, of which the following description, in connection with the accompanying drawings, is a specification, like letters on the drawings representing like parts.

This invention has for its object to improve the shuttle-box mechanism of looms, whereby the shuttle-boxes at each end of the loom are operated from one end of the loom in a very simple manner, as will be described, and to improve mechanism whereby the presence of a shuttle in each of the two shuttle-boxes at the level of the race of the lay and at opposite ends of the lay will automatically effect the stopping of the loom.

My invention consists in a series of partial gears, means to operate them, vibrators and toothed gears mounted thereon and operated by the said partial gears, shuttle-boxes, shuttle-box levers, and means to connect the said levers and boxes, combined with eccentrics or movable fulcra for the said levers, cranks to actuate the said levers, and with connecting mechanism between the said toothed gears and the said eccentrics and cranks, whereby the said shuttle-boxes are operated positively, substantially as will be described; also, in a series of shuttle-boxes, their binders, and a shaft provided with arms, and a dagger, combined with fingers actuated by the said binders, and with means, substantially as described, between the said fingers and the said arms to stop the loom when two shuttles appear in two boxes directly at the opposite end of the lay as the shuttle is to be thrown.

Figure 1:
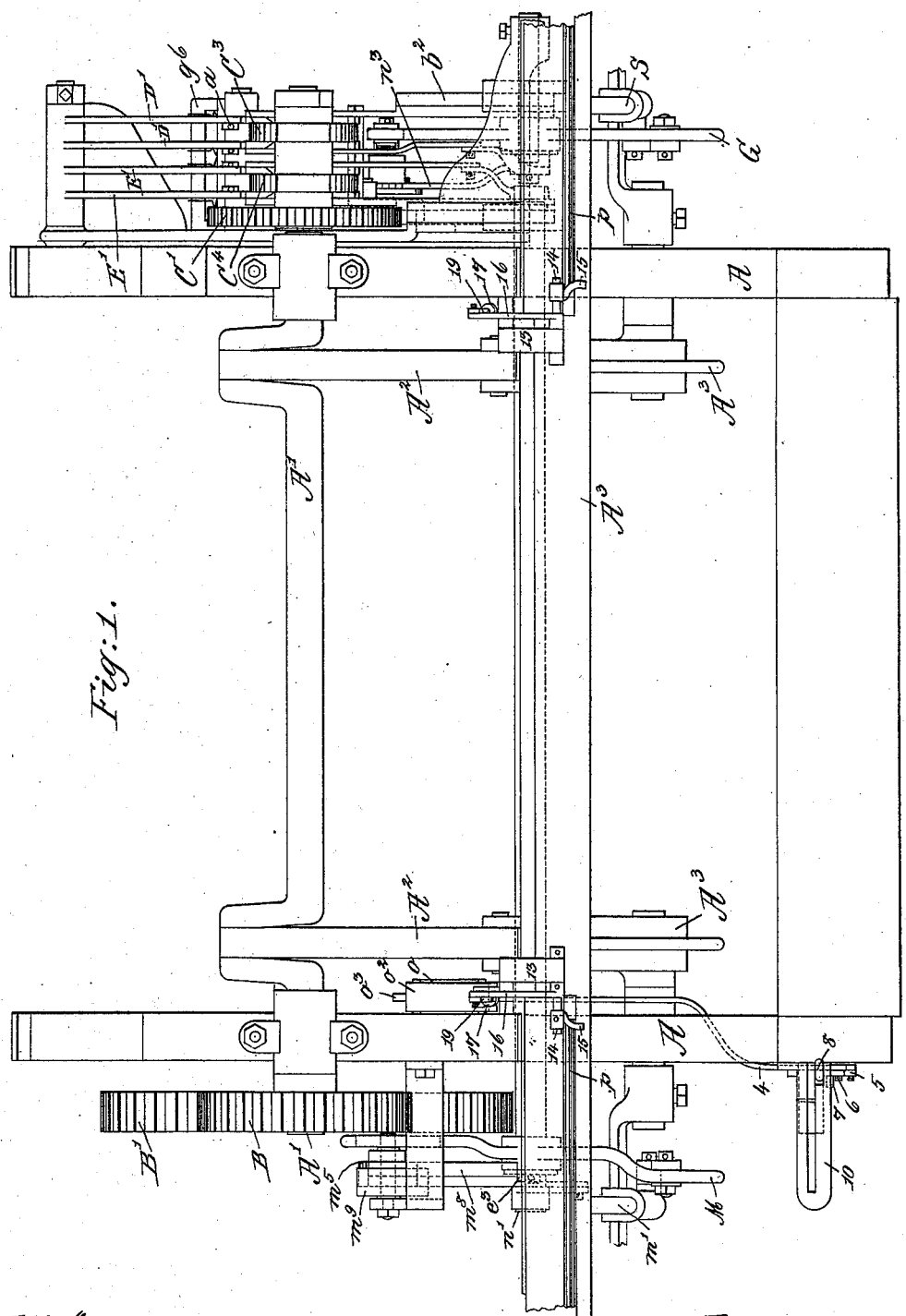
Figure 2:
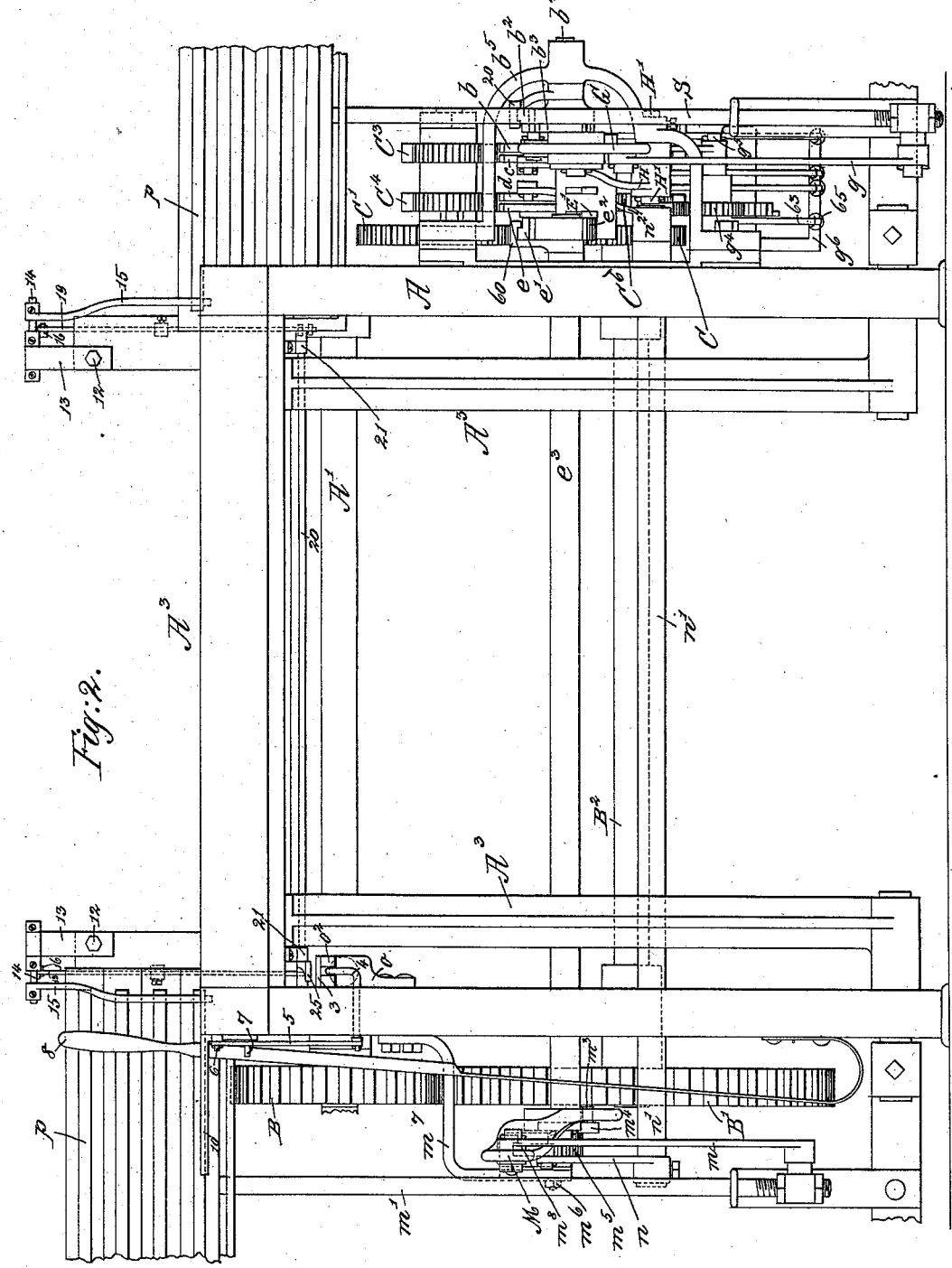
Figure 3:
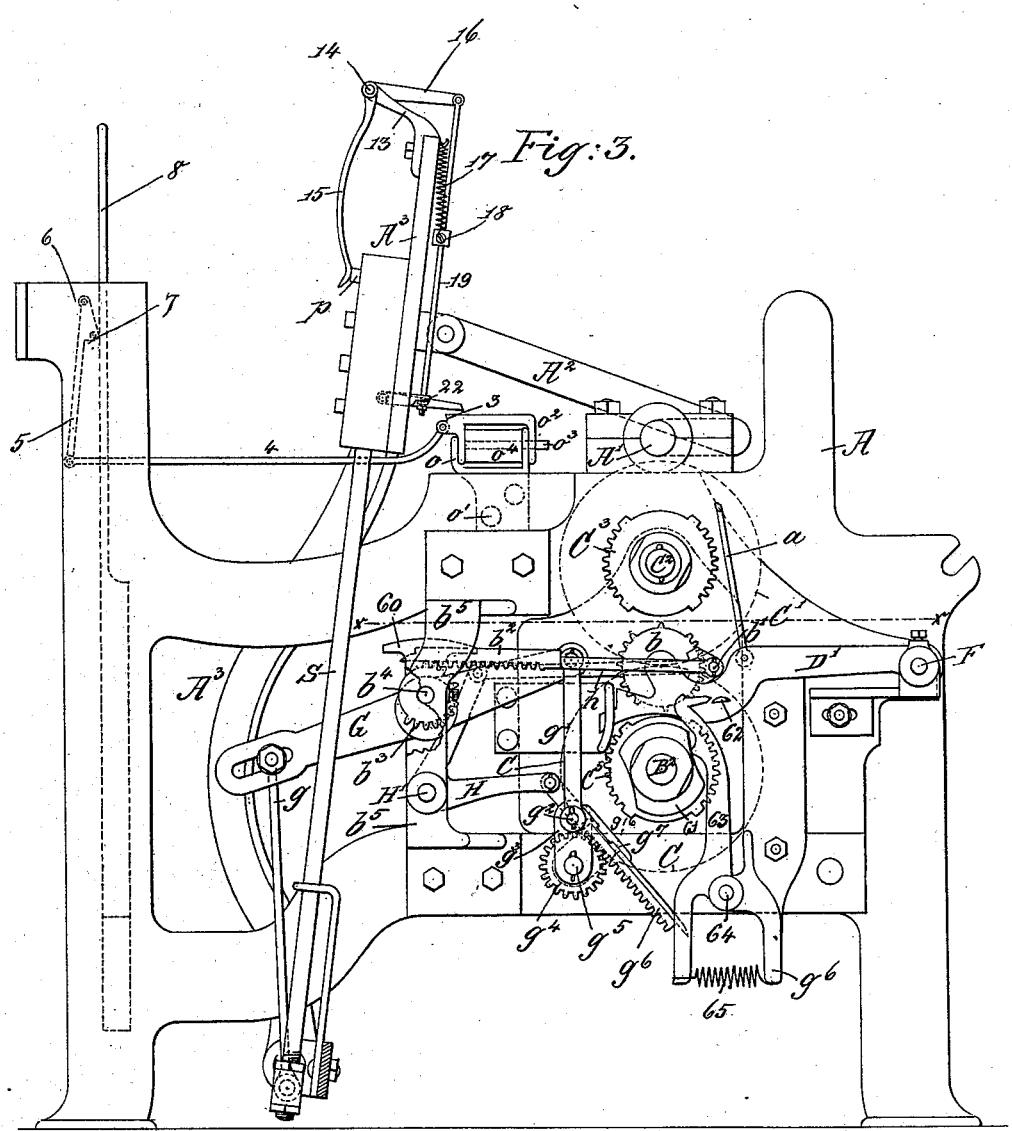
Figure 4:
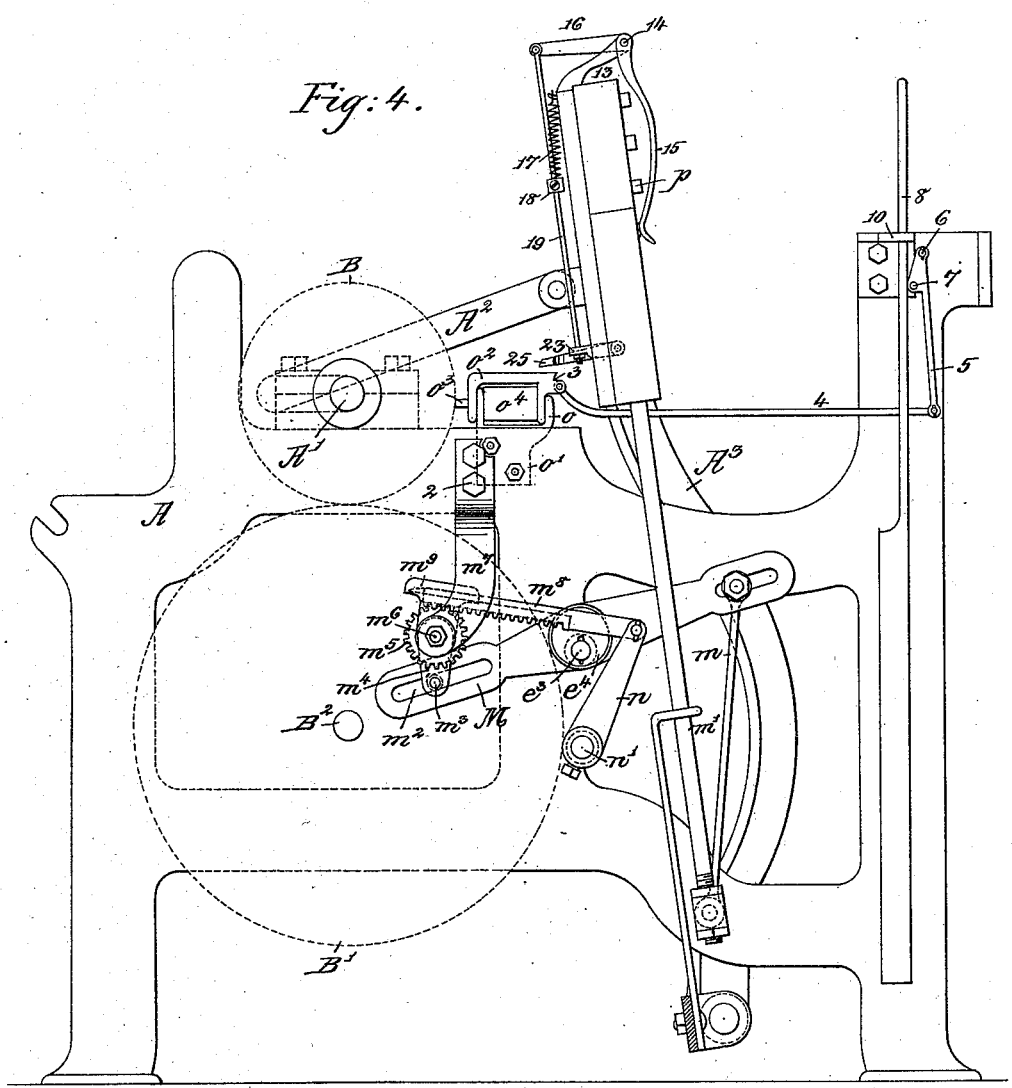

Figure 1 is a plan or top view of a loom embodying my invention; Fig. 2, an elevation of the same, looking at it toward the breast-beam or from the front of the loom, the outer ends of the shuttle-boxes and binders being broken off to save space on the drawing; Fig. 3, a right-hand end view of the loom; Fig. 4, a left-hand elevation thereof; Fig. 5, a partial section below the dotted line $xx$, Fig. 3; Fig. 6, a detail showing one of the toothed eccentrics forming the fulcra for the shuttle-box lever at the right-hand end of the loom; and Fig. 7 a detail in elevation of a modification of my invention wherein the shaft $n'$ is connected with the rear end of one of the shuttle-box levers by a bar and connecting-rod.

The loom-frame A, of suitable shape to support the working parts, has usual boxes to receive the crank-shaft A′, which may be driven in any usual manner. The shaft A′, connected by pitmen $A^2$ to the lay $A^3$, has a pinion, B, which engages the toothed gear B′, fast on the usual lower shaft, $B^2$, which in practice will be provided with usual devices for operating the usual mechanism for actuating the picker-sticks, substantially as in United States Patent No. 265,659.

The shaft $B^2$ at one end has attached to it a gear, C, (shown by dotted lines in Fig. 3,) which engages and rotates a gear, C′, also shown by dotted lines, Fig. 3, of like diameter, loose on the stud $C^2$, extended horizontally from the loom side and having attached to and so as to rotate with it two gears, $C^3$ and $C^4$, some of the teeth of which at opposite points (see Fig. 3) are cut away, so as to engage and then pass out from engagement with the toothed wheels $b\ c\ d\ e$, having attached cranks and mounted upon pins or studs carried by vibrators D′ E′, pivoted at F on a stand at the loom side. The shaft $B^2$ at one end has attached to it two gears, $C^5\ C^6$, which are counterparts of the gears $C^3$ and $C^4$, and which move in unison with them, but in an opposite direction. The gears $C^5\ C^6$ serve, when the toothed gears $b\ c\ d\ e$ are permitted to engage with them, to turn the said toothed gears for a partial rotation in a direction opposite that which the gears $C^3$ and $C^4$ would turn them. The toothed gears $b\ c\ d\ e$ are made to engage the toothed gear above or below them, according to the position of the vibrators, their positions being changed from time to time through a rod, $a$, one for each vibrator, such rod being connected at its upper end to a finger moved by a pattern-chain or surface, as in United States Patent No. 281,842. The toothed gear $b$ has a crank-pin, $b'$, over which is placed one end of a rack-bar, $b^2$, which is held in engagement by a ledge, 60, with a pinion, $b^3$, mounted on a stud, $b^4$, held in a stand, $b^5$, the said pinion having an attached eccentric, $b^6$, (see Fig. 6,) where the said eccentric and connected parts are shown detached.

The shuttle-box lever G between its ends has a hub which is fitted upon the said eccentric as a fulcrum, the oscillation of the said pinion $b^3$ causing the said shuttle-box lever to be raised and lowered. The front end of the lever G is connected by a link, $g$, to the shuttle-box rod $s$ in usual manner. The rear end of the lever G has attached to it a link, $g'$, which is attached to a pin, $g^2$, of an arm, $g^3$, attached to the pinion $g^4$, loose on a stud, $g^5$, of a stand, $g^{16}$, secured to the loom side. The pinion $g^4$ is engaged by a rack, $g^6$, held in engagement with it by a guide, $g^7$. The end of the rack $g^6$ is jointed to one arm of an elbow-lever, H, having its fulcrum on a stud, H′, in the stand $b^5$, the opposite end of the said lever having attached to it a connecting-rod, $h$, one end of which has a hole and is fitted over a crank-pin on the toothed wheel $c$ carried by one of the vibrators D′.

Having described the manner of actuating the shuttle-box lever G at one side of the loom, I will now describe the mechanism for moving the shuttle-box lever M at the opposite side of the loom, first stating, however, that each of the said levers G and M, as herein shown, is adapted to be moved in such manner and for such distances as to enable any one of four shuttle-boxes to be placed at will opposite the raceway of the lay.

When the eccentric $e^4$, which serves as the fulcrum for the shuttle-box lever, is turned from one to its other position, the end of the shuttle-box lever connected to the shuttle-box rod is moved a distance sufficient to move the shuttle-boxes so as to place opposite the raceway of the lay the next box to that just used; but when the pinion $g^4$, its crank-pin, and connecting-rod are moved the outer end of the shuttle-box lever is moved twice as far, or for a distance to place opposite the raceway of the lay the second box from the one just used. By combining these movements or causing them to be made in opposition in unison any one of four boxes may be placed in correct operative position with relation to the raceway of the lay.

The toothed gear $e$, or the one nearest the loom side, has a crank-pin which receives upon it a toothed connecting-rod, $e'$, which is just the same as the rod $b^2$, the said rod $e'$ engaging a toothed pinion, $e^2$, fast on the shaft $e^3$, extended across the loom-frame, where (see Fig. 4) it is provided with an eccentric hub, $e^4$, which serves as the fulcrum for and receives upon it the hub of the shuttle-box lever M, the forward end of which, by a connecting-rod, $m$, is joined in usual manner to the shuttle-box rod $m'$ at that side of the loom. The lever M at its rear end is slotted, as at $m^2$, to receive a crank-pin, $m^3$, of an arm, $m^4$, attached to the gear $m^5$, mounted loosely on a stud, $m^6$, held in the bracket or stand $m^7$, bolted to the loom side at 2. The gear $m^5$ is engaged and oscillated for substantially a half-rotation by a rack, $m^8$, held in engagement therewith by a lug, $m^9$, fast to the said bracket, (see Fig. 4,) one end of the said rack-bar being joined by a pin to an arm, $n$, fast to a shaft, $n'$, having suitable bearing in the loom-frame. This shaft $n'$ is extended across to the opposite side of the loom, where it has attached to it an arm, $n^2$, (see Fig. 5,) to which is jointed a connecting-rod, $n^3$, one end of which is fitted over a crank-pin carried by the toothed gear $d$, the said eccentric-hub $e^4$ and the crank-pin of the gear $m^5$ moving the shuttle-box lever M in the same time and order that the devices at the opposite end of the loom move the shuttle-box lever G.

From the foregoing it will be seen that the shuttle-box levers and shuttle-boxes at the opposite sides of the loom are moved by the toothed gear, carried by vibrators at one side of the loom, through the intervention of shafts and positively-acting intermediate connections, and entirely without the employment of chains or usual flexible connections.

The loom-frame at one side has a stand, $o$, bolted to it at $o'$, the said stand having ears and a pin, $o^3$, to receive the ears of a bunter, $o^2$, the pin having upon it between two of the ears of the stand and of the bunter a spring, $o^4$, preferably a block of india-rubber. The bunter has a notch, 3, and is connected by a rod, 4, to one end of a radius-bar, 5, pivoted at 6, (see Figs. 1 and 2,) near the shipper-handle 8, which may be of any usual construction. The radius-bar 5 has a pin, 7, which, when both of the binders are moved inward toward the shuttle-box lever, as will be described, acts to push the shipper-lever out of the usual holding-notch in the shipper-handle holding-plate 10. The upper end of each sword of the lay has bolted to it at 12 a bracket, 13, which receives a short shaft, 14, to each end of which is attached a finger, 15, and an arm, 16. One end of each finger 15 is normally pressed toward the usual binders, $p$, of the series of shuttle-boxes, with which it co-operates by means, as herein shown, of a spring, 17, connected at one end to the sword of the lay and at its other end to an adjustable collar, 18, attached to a rod, 19, the upper end of which, there being one rod at each side of the loom, is attached to one of the arms 16. The binders $p$ are and may be substantially such as partially shown by United States Patent No. 282,502, and as now commonly used in looms.

The lay between the loom sides is provided with a rock-shaft, 20, mounted in bearings 21. This rock-shaft at one end has an arm, 22, (see Fig. 3,) and at its opposite end (see Fig. 4) an arm, 23, one of the rods 19 being extended through a hole in each of the said arms, nuts being applied to the said rods below the said arms. The rock-shaft 20, near the arm 23 and in line with the bunter $o^2$, has a dagger, 25. When this dagger is permitted to fall and strike the notch 3 of the said bunter, the latter is moved to effect the release of the shipper-handle, and thereafter through usual means stop the movement of the loom, and at the same time the dagger, meeting the said bunter, stops the backward movement of the lay.

The object of the mechanism described is to stop the loom whenever in its operation two shuttles happen accidentally to arrive in boxes located directly opposite the race of the lay and as the usual pickers are about to be operated to throw the shuttles. Should this occur, the binders of each of the said shuttle-boxes would at the same time hold outward the finger 15, as shown by the finger 15 in Fig. 3, and the shaft 20 would be turned far enough to permit both arms 22 23 to descend, and the dagger 25 to meet the notch 3 of the bunter. In case, however, that one of the shuttle-boxes opposite one end of the raceway of the lay when the shuttles are being thrown is empty, then the finger 15, co-operating with the binder of the then empty shuttle-box, as in Fig. 4, is not pressed outward to thus lower, as described, the rod 19, and with it the arm 23, supported by a nut on the said rod for a distance sufficient to enable the dagger to strike the bunter, and consequently, whenever one of the said shuttle-boxes opposite the raceway is empty the loom is not stopped.

Should the shuttle-boxes in their movement by the mechanism described fail to be operated in the proper time and order in accordance with the demands of the usual pattern-surface to be employed, and two shuttles should accidentally be contained in shuttle-boxes stopped at opposite ends of the raceway of the lay, the fingers 15 and their connected devices, as described, will prevent breakage of the shuttle-box mechanism.

The shipper-handle will, in practice, co-operate with intermediate mechanism—such as shown in the United States Patent No. 265,659, to move a belt-shipper upon a loose pulley and effect the stopping of the loom as common in the said loom.

In order to hold the small-toothed gears $b$ $d$ $c$ $e$ in engagement with the partial-toothed gears when the gears are to be partially rotated, I have provided each vibrator with a lug, 62, which is engaged by a latch, 63, pivoted at 64, the said latch having connected to it at one end a spring, 65, which normally keeps the toe of the latch pressed toward the hubs of the lowermost partial gears, the said hubs being made cam-shaped to throw the latches into engagement with the lugs at the proper time.

I do not desire or intend to limit my invention to the exact connecting devices between the gears oscillated by the partial gears, and the shafts which are extended across the loom to effect the movement of the shuttle-box lever at the opposite side of the loom, and for the said connecting devices I may use any well-known equivalent devices.

In Fig. 7 the arm $n$, attached to the shaft $n'$, before referred to, is shown as changed from the position represented in Fig. 4, and a connecting-rod, $n^{20}$, attached to it is placed upon a pin, $n^{22}$, secured directly to one end of the shuttle-box lever at that side of the loom, such modification enabling me to dispense with the gear $m^5$ and its attached crank $m^4$.

If it is desired not to stop the backward movement of the lay when the dagger engages the bunter, then the spring $o^4$ may be omitted from the stand $o$, and the bunter $o^2$ will then, after disengaging the shipper-lever from the notch, as above described, move backward the whole extent of the movement of the lay, and the movement of the loom will be arrested in the usual manner.

By the term "crank," as applied to the device which co-operates with the rear end of the shuttle-box lever M to vibrate it, I mean to include as an equivalent an eccentric, as the employment of an eccentric instead of a crank would be within the scope of my invention.

I claim—

1. The combination, in a loom, of the following instrumentalities, viz: the partial gears $C^3$ $C^4$ $C^5$ $C^6$, the vibrators, the toothed gears $b$ $c$ $d$ $e$, mounted upon the said vibrators and located all at one side the loom-frame, means to operate the said partial gears to actuate the said toothed gears, the shuttle-box levers G and M, one at each side of the loom, the eccentrics $b^6$ and $e^4$, on which the said levers are mounted, connections between the gear $b$ and eccentric $b^6$, the shaft $e^3$, extended across the loom-frame and carrying the eccentric $e^4$, the pinion $e^2$ thereon, the toothed connecting-rod to actuate the said pinion from the said gear $e$, the shaft $n'$, extended across the loom-frame, means, substantially as described, between the said shaft and the rear end of the lever M, to move it about its fulcrum, and means between the said shaft $n'$ and the toothed gear $d$, whereby the said gear is enabled to actuate the said shaft, and a crank, as $g^3$, and means between it and the said gear $c$ to actuate the said crank, and connections between the said crank and the said lever G, the combination being and operating substantially as described, whereby both shuttle-box levers at opposite sides of the loom are operated positively.

2. The shuttle-box lever M, the shaft $e^3$, the eccentric $e^4$, the pinion $e^2$ thereon, the toothed gear $e$, means between it and the said pinion to oscillate the said shaft, means to oscillate the said toothed gear, the toothed pinion $m^5$, and its co-operating crank-pin $m^3$, combined with the toothed gear $d$, means to oscillate it, and means, substantially as described, actuated by it to operate the said toothed gear $m^5$, for the purpose set forth.

3. The toothed gears $b$ $c$, means to oscillate them, the gear $b^3$ and its attached eccentric, the shuttle-box lever G, mounted thereon, the link $g'$, the shuttle-boxes, and means to connect them operatively with the said lever, the gear $g^1$ and its co-operating crank-pin $g^2$, and the elbow-lever H, combined with means actuated by the said toothed gears $b\ c$, to oscillate the pinion $b^3$ and the lever H, and with means actuated by the lever H to oscillate the gear $g^1$, substantially as described.

4. The series of shuttle-boxes, their binders, and the shaft 20, provided with arms 22 23, and a dagger, 25, combined with two fingers, 15, actuated by the said binders, and with means, substantially as described, between the said fingers and the said arms 22 23 to move the said shaft 20, to operate substantially as described.

5. The bunter, means to support it, the rod 20, having the dagger and the arm 23, the rod 19, and means to normally elevate it, the arm 16, shaft and finger 15, combined with shuttle-boxes, and binders to operate the said finger, substantially as described.

6. The partial gears $C^3\ C^4\ C^5\ C^6$, vibrators, and toothed gears mounted thereon, all located at one side of the loom-frame, the shaft $e^3$, extended across the loom-frame, and means between one of the toothed gears and the said shaft to oscillate the latter, combined with the eccentric $e^4$, attached to the shaft $e^3$ at that end of the loom farthest from that at which said vibrators and toothed gears are mounted, the shuttle-box lever M, mounted on the said eccentric, a crank at the same side of the loom as the eccentric and in connection with the said shuttle-box lever, and devices for communicating motion to the said crank from one of the said gears mounted on the vibrators, to operate substantially as described.

7. The shaft $n'$, extended across the loom, its attached arm $n$, the lever M, and connecting mechanism, substantially as described, between the said arm and the end of the said lever M, to move it, combined with the partial gears $C^4\ C^6$ at the opposite side of the loom, a toothed gear, $d$, located between them and having a crank, a vibrator upon which the said gear $d$ is mounted to oscillate, and means, substantially as described, between the said gear $d$ and the said shaft $n'$, to oscillate said shaft, substantially as described.

8. The lay, two series of shuttle-boxes mounted to slide therein, the binders, shafts 14, the fingers 15 on said shafts actuated by said binders, arms 16 on said shaft, the shaft 20 and its arms 22 and 23, rods 19, and springs 17 to lift the said rods, combined with a dagger on shaft 20 and a bunter, the combination being such, substantially as described, that the outward movement of both of the two fingers resting on the said binders is required to oscillate the shaft 20 and place the dagger in operative position.

In testimony whereof I have signed my name to this specification in the presence of two subscribing witnesses.

HORACE WYMAN.

Witnesses:
   GEO. W. FARRINGTON,
   JUSTIN A. WARE.